United States Patent [19]

Korb

[11] Patent Number: 5,216,477
[45] Date of Patent: Jun. 1, 1993

[54] EDGE TECHNIQUE FOR MEASUREMENT OF LASER FREQUENCY SHIFTS INCLUDING THE DOPPLER SHIFT

[76] Inventor: Charles L. Korb, 10616 Great Arbor Dr., Potomac, Md. 20854

[21] Appl. No.: 702,529

[22] Filed: May 20, 1991

[51] Int. Cl.⁵ ............................................. G01P 3/36
[52] U.S. Cl. .................................. 356/28.5; 356/349
[58] Field of Search ........................... 356/28.5, 349

[56] References Cited

U.S. PATENT DOCUMENTS

| | | | |
|---|---|---|---|
| 4,493,553 | 1/1985 | Korb | 356/43 |
| 4,610,540 | 9/1986 | Mossey | 356/28.5 |
| 4,838,687 | 6/1989 | Pfeifer | 356/28.5 |
| 4,919,536 | 4/1990 | Komine | 356/28.5 |
| 5,094,532 | 3/1992 | Trainer et al. | 356/336 |

OTHER PUBLICATIONS

Korb et al., "A lidar system for measuring atmospheric pressure and temperature profiles" Dec. 1987.
Korb et al., "Airborne & ground based lidar measurements of the atmospheric pressure profile", Aug. 1989.
Summary of paper presented at the Conference on Lasers and Electro-Optics 21-25 May 1990.
Abstract of papers from 15th Int'l. Laser Radar Conference, Jul. 23-27, 1990.

*Primary Examiner*—Stephen C. Buczinski

[57] ABSTRACT

A method for determining the frequency shift in a laser system by transmitting an outgoing laser beam, receiving an incoming laser beam having a frequency shift, acquiring a first signal by transmitting a portion of the incoming laser beam to an energy monitor detector and a second signal by transmitting a portion of the incoming laser beam through an "edge" filter to an edge detector, deriving a first normalized signal which is proportional to the transmission of the "edge" filter at the frequency of the incoming laser beam, deriving a second normalized signal which is proportional to the transmission of the "edge" filter at the frequency of the outgoing laser beam, and determining the frequency shift by processing the first and second normalized signals.

32 Claims, 5 Drawing Sheets

EDGE TECHNIQUE FOR MEASUREMENT OF LASER FREQUENCY SHIFTS INCLUDING THE DOPPLER SHIFT

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to high resolution frequency shift measurements with laser systems which includes Doppler shift measurement techniques to determine the velocity of moving targets and to the study of atmospheric phenomena such as wind and wind shear.

BACKGROUND ART

The measurement of Doppler shifts from hard targets, which leads to a determination of their velocity, is a well developed radar technique. The basic method used to determine the Doppler shift is heterodyne detection. In this method, a coherent electromagnetic pulse is sent out and scattered off objects whose size is of the order of or larger than the wavelength of the radiation which is on the order of meters. The backscattered radiation is collected and mixed with radiation from a highly stable local oscillator on a suitable detector. The resulting beat frequency corresponds to the Doppler shift which then leads to a determination of the velocity. To achieve efficient mixing, the transmitted and collected backscattered signals must correspond to a single diffraction limited spatial element for that wavelength. In addition to measuring the velocity of hard targets, high power ground-based radar has been used to measure the wind using scatter from atmospheric targets such as precipitation and refractive index features which leads to a wind determination if the features have sufficient scattering and if the features are assumed to move with the wind. The recognition of the dangers of wind shear to aircraft has led to the installation of Doppler radar at airports even though these systems cannot make measurements at low altitude, i.e., in the first kilometer, which is the region of most importance for aircraft landing and takeoff.

The importance of wind measurements for meteorology has led to the development of optical heterodyne techniques using $CO_2$ lasers near 10 $\mu$m, some work on developing heterodyne techniques and solid state laser in the 1 to 2 $\mu$m region such as Nd:YAG lasers at 1.06 $\mu$m and Tm:Ho:YAG lasers near 2 $\mu$m. These systems utilize the backscatter from aerosols suspended in the atmosphere. There are major problems with these techniques for wind measurements as discussed in the following paragraphs. Optical heterodyne systems at these wavelengths are also being developed for ranging as well as velocity measurements. Optical heterodyne techniques have been used in laboratory environments to measure the velocity in gas and fluid flow systems using He:Ne lasers by introducing seed particles into the flow. Other techniques that have been proposed for wind measurements include a frequency scanned Fabry-Perot etalon, using both pulsed and continuous wave lasers. For a pulsed system, the frequency scan must be done in a time-independent manner since the detection time is very short and will not allow the frequency to be scanned as a function of time. A spatially scanned system with a multi-element detector is used to accomplish the frequency scan.

There are a number of problems and disadvantages associated with heterodyne detection. In general, heterodyne detection requires that the signal received be coherent and correspond to a diffraction limited beam. For radar systems with large wavelengths, this requires large receivers and transmitters on the order of 100 to 1,000 times the wavelength, to achieve high spatial resolution (20 to 2 mrad). For radar wind measurements, no measurements can be obtained in approximately the first km of range which is the crucial area for data for wind shear and downburst detection for aircraft landing and takeoff at airports. In addition, very large and high power systems are required. This limits their applicability to fixed ground-based systems and prevents their use on aircraft or from outer space.

The use of optical heterodyne techniques with $CO_2$ lasers in the 10 $\mu$m region to obtain wind measurements in the atmosphere has the problem of very low backscatter since there are very few aerosol particles with a size of the order of or larger than 10 $\mu$m in the atmosphere. In addition, the accuracy of the Doppler shift determination for a heterodyne system is limited by the spectral width and frequency jitter of the laser. For a 1 m/sec velocity accuracy with a $CO_2$ laser, the spectral bandwidth requirement is on the order of 200 kHz which limits the range resolution to approximately 0.5 km due to the transform limit. The practicality of building high power $CO_2$ lasers for long-range or satellite measurements of the atmosphere with up to 10 J/pulse while having a spectral bandwidth of 200 kHz also presents a major engineering problem. The use of optical heterodyne techniques for wind measurements in the atmosphere with lasers at wavelengths from the visible to 1.5 $\mu$m is restricted to lasers of very low laser energy by considerations of eye safety. This occurs since the required diffraction limited beam for heterodyne detection would produce extremely high laser energy densities for pulsed lasers. This precludes the use of the high aerosol backscatter at short wavelengths. It also prevents the use of the well developed Nd:YAG laser for measurements of velocity or wind at 1.06 $\mu$m or at shorter wavelengths for most practical applications.

STATEMENT OF THE INVENTION

It is therefore an object of the present invention to provide an improved apparatus and method for the measurement of laser frequency shifts (e.g., Doppler) and the detection of the velocity and location of a target.

It is another object of the present invention to provide an extremely powerful method for measuring wind velocity and wind shear as a function of range with high accuracy and high range resolution using either aerosol or molecular backscatter or a combination thereof.

It is a further object to provide a differential frequency technique to measure the Doppler shift with a laser system and thus render the measurements relatively insensitive to laser frequency jitter and drift.

It is a still further object to provide a method that is relatively insensitive to the spectral bandwidth of the laser.

It is a still further object to provide a method that can normalize out the magnitude of the signal from the backscattering source or the target.

The foregoing objects are achieved by providing an apparatus and method that will achieve frequency measurement accuracy on the order of one hundred times better than the spectral bandwidth of the measurement. In contrast, for heterodyne detection, the accuracy of the Doppler shift measurement is on the order of the laser bandwidth and frequency stability. The relatively broad laser spectral width allowed by the present inventive technique permits a proportionately shorter (100 times) transform limited temporal pulse width and a corresponding improvement in range resolution. Also, for the present inventive technique, the optical requirements for a large diameter telescope are hundreds of times diffraction limited, whereas a heterodyne system requires diffraction limited operation. For coherent lidars operating at wavelengths much shorter than 10 $\mu$m, this requirement effectively limits the choice of wavelength to the eye safe region (wavelength $>1.5$ $\mu$m) because of the high laser energy density in the transmitted beam and imposes severe limitations on the pointing accuracy and the optical quality of large optical elements. A lidar system utilizing the present technique in the visible and near-infrared would obtain orders of magnitude larger signal than in the thermal infrared. For the present inventive system working at ultraviolet wavelengths, the Rayleigh (molecular) backscatter would provide an even larger signal.

A significant new feature of the present invention is the use of an "edge" of the spectral response function of an optical filter to measure the frequency, e.g., Doppler, shift of a laser beam and thus, to determine velocity. This "edge technique" allows a broadband laser to be used to obtain a frequency measurement accuracy that is as much as 100 or more times better than the spectral bandwidth of the laser and the "edge" filter. The present invention also utilizes a differential frequency measurement to determine the Doppler shift which allows the frequency of the backscattered signal from the aerosols and/or molecules in the atmosphere (or a hard target) to be measured relative to the frequency of the outgoing laser beam. In addition, the use of a differential frequency measurement on a per pulse basis renders the measurement insensitive to laser frequency jitter and drift as well as to "edge" filter frequency jitter and drift providing the laser frequency remains reasonably on the side of the "edge" filter, i.e., at a location near the half-width of the "edge" filter. The present invention also uses a new concept, an energy monitor channel, to normalize the "edge" filter measurement for the signal magnitude for both the outgoing and backscattered laser signals on a per pulse basis. The present invention has the ability to make high accuracy measurements of the velocity of the wind or a hard target using either the backscatter from aerosols or the backscatter from molecules in the atmosphere or the scatter from the hard target. In the case of aerosols or hard targets, the aerosol or hard target backscatter frequency shifts but does not appreciably broaden the laser spectral return. On the other hand, the molecular backscatter greatly broadens the width of a spectrally narrow laser due to the thermal motion of molecules in the atmosphere. In addition, the average drift velocity of the molecules also produces a relatively small frequency shift corresponding to the wind. The "edge technique" allows this small frequency shift, due to the wind, to be accurately measured directly in spite of the broad width of the backscattered laser return (due to the thermal motion of the molecules in the atmosphere).

Two different types of basic measurements that can be made using the "edge technique" of the present invention are as follows. Measurements can be made using a distributed target, one which is distributed with range such as molecules, aerosols, or a combination of these in the atmosphere. Alternatively, measurements of velocity can be made from a hard target at a fixed range. For a pulsed laser and range gated receiver, velocity can be determined from the Doppler shift as a function of range for each pulse, where the range measurement is made using the time of flight of the laser pulse. A pulsed laser may be used with either a distributed or a hard target which, for example, would lead to measurements of the wind as a function of range for a distributed target in the atmosphere or the velocity and range of the hard target for the latter case. In addition, a continuous wave (CW) laser can be used for high accuracy velocity measurements of a hard target. In this case, range information would not normally be determined. An alternative embodiment with a continuous wave laser would employ a pulse code or other modulation of the CW laser and detection with a range gated receiver. Analysis of the modulation information on the backscattered return would allow the measurement of the wind as a function of range for a distributed target or the velocity and range for a hard target, i.e., it would allow range information to be determined.

Wind measurements are an important example of applications of the "edge technique" of the present invention. The measurement of the wind from satellites in three dimensions on a global basis is considered the single most important measurement in the atmospheric sciences. Measurements of wind from aircraft or the ground would provide important high spatial resolution information for localized weather forecasting and nowcasting, particularly in the case of severe storm outbreaks.

An important commercial application of wind measurements would be their use at airports to identify wind shear, microburst, and clear air turbulence conditions which can result in aviation disasters. A microburst is a highly localized downburst condition with an outburst of damaging winds at or near ground level. Strong clear air turbulence is generally associated with high wind shear conditions. Wind shear appears as an abrupt change in the wind speed or direction. Wind shear and downburst conditions, including microbursts, would be directly observed with a lidar system using the "edge technique" of the present invention. Ground-based systems located at airports could measure the wind using a single transmitter/receiver in a spatial scanning mode to determine the three dimensional (3D) wind field. The measurements would include, as a minimum, those discussed below for a fixed transmitter/receiver. Alternatively, two fixed transmitter/receivers could be used in an orthogonal mode; one aligned for example with the north-south direction, the other with the east-west direction, and each pointed at an elevation angle on the order of 45 to 75 degrees. This would allow the 2D horizontal wind field to be found assuming the vertical component of the wind is negligible. A third channel pointed along the vertical would allow the vertical velocity to be measured and thus the 3D wind field to be determined. The above methods require the assumption of horizontal homogeneity in the wind field over the region of measurement. An alternative method of implementation which would not require this assumption utilizes two spatially separated scanning transmitters used for example in the orthogonal mode discussed above with at least one co-aligned receiver. The two orthogonal transmitters separated by a distance of the order of 0.5 to 1 km (and transmitting in the north-south and east-west planes) would be aligned to illuminate the same volume element of the atmosphere to yield a measurement of the wind at that altitude. A scan of the two transmitter and co-aligned receivers in elevation angle would then provide a determination of the wind as a function of altitude. An additional measurement with one transmitter/receiver along the vertical would provide the vertical velocity. Measurements of the wind profile from the ground to 1 km altitude are most important for wind shear and microburst detection at airports. These systems would identify wind shear and potentially dangerous clear air turbulence conditions during landing and takeoff periods when aircraft are very vulnerable. In addition, a wind shear detection system on individual aircraft could provide warning well in advance of dangerous wind shear/clear air turbulence conditions to allow pilots to make necessary changes in course. A forward-looking system could scan the air volume in azimuth and/or elevation to determine the wind field for ranges on the order of a hundred meters to tens of kilometers ahead of the plane. Alternatively, a non-scanning forward-looking system employing one or more fixed transmitter/receivers at various viewing angles relative to the velocity vector of the aircraft (i.e., $0°, \pm 10°, \pm 20°$) could also be used to identify wind shear or microburst conditions. The simplest wind shear detection system would identify wind shear by looking for abrupt changes in the measured wind field. For implementation on an aircraft (or satellite) the outgoing laser frequency or "edge" filter frequency could be offset to provide compensation for the Doppler shift due to the vehicle velocity.

DETAILED DESCRIPTION OF THE INVENTION

Figure 1:
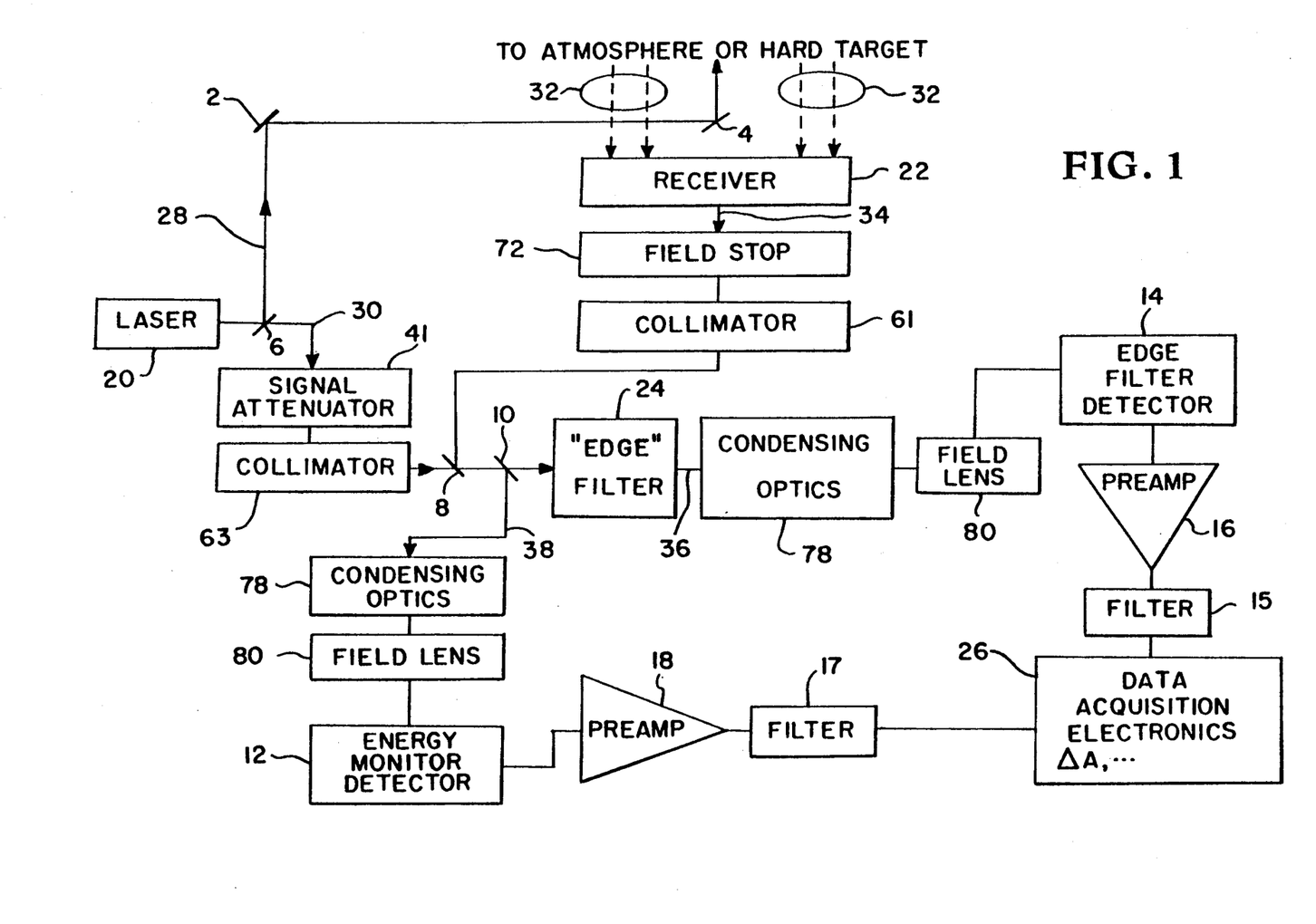
FIG. 1 is a schematic diagram of a laser apparatus for velocity measurement according to the present inventive techniques.

Referring now to FIG. 1, a schematic diagram of a lidar system which uses the "edge" of the spectral response function of an optical filter 24 and a narrowband laser 20 to measure the frequency (e.g., Doppler) shift is shown. Laser 20 emits an outgoing laser signal 28 which is directed outward towards the atmosphere or a target through mirrors 6, 2 and 4. Mirrors 2 and 4 are conventional mirrors well known in the art for directing laser beams while mirror 6 is a high reflectivity beam splitting mirror which allows a small fraction of the outgoing laser signal 28 to be "picked off"; the "picked off" signal is shown by line 30. Signal 30 is supplied to signal attenuator 41 (neutral density filters) which attenuates the signal to the same order of magnitude as that backscattered from the atmosphere or target. The output of signal attenuator 41 is supplied to collimator 63 which collimates the beam to match the angular field of its output to that of the angular field of the output signal of collimator 61. The output of collimator 63 travels through beam splitting mirror 8 to beam splitting mirror 10 where it is split again and directed to "edge" filter 24 (then through condensing optics 78 and field lens 80 to edge filter detector 14) and through condensing optics 78 and field lens 80 to energy monitor detector 12. In optical measurements, a detector is used to convert light intensity to a measurable form of electrical signal. For ultraviolet and visible wavelengths the photomultiplier tube (PMT) is a sensitive, widely used detector where the photons falling on the cathode surface generate photoelectrons. This photoelectron flux is amplified inside the tube by means of a dynode chain to produce a current at the anode. For near infrared wavelengths, the avalanche photodiode, a semiconductor device with photoelectron multiplication and high sensitivity, is a suitable detector. Meanwhile, a portion of outgoing laser signal 28 is backscattered from each range element of the atmosphere or from a hard target and the resultant incoming signal 32 is collected by receiver 22. The collected incoming signal 34 is supplied through field stop 72 to collimator 61 which collimates the beam to satisfy any angular field (collimation) requirements of the edge filter 24. The output of collimator 61 is directed by the high reflectivity beam splitting mirror 8 to beam splitting mirror 10 where the signal is split and directed to "edge" filter 24 (then through condensing optics 78 and field lens 80 to edge filter detector 14) and through condensing optics 78 and field lens 80 to energy monitor detector 12. The two signal outputs of detectors 14 and 12 are then directed through preamps 16 and 18 respectively, through analog filters 15 and 17, and then to the data acquisition electronics 26 for processing. The data acquisition electronics 26 converts the analog electrical signals to digital information and records that information on magnetic tape (if desired). The same microprocessor that controls laser 20 also controls the data acquisition equipment. The CAMAC Standard (ANSI/IEEE 583-1975) can be used as the format for data acquisition equipment. Contained in this system are a controller, two transient digitizers, two programmable clocks, a charge digitizer, and the lidar control module which contains circuits to control timing functions, such as the firing of the laser and the gating of the detectors and transient digitizers. Various microprocessors can be used for system control and the coordination of all I/O such as an LSI-11/23 or an IBM PC. A 12-bit 20-MHz CAMAC transient digitizer (DSP Technology model 2012F) can be used to digitize the output of the detectors.

Figure 2:
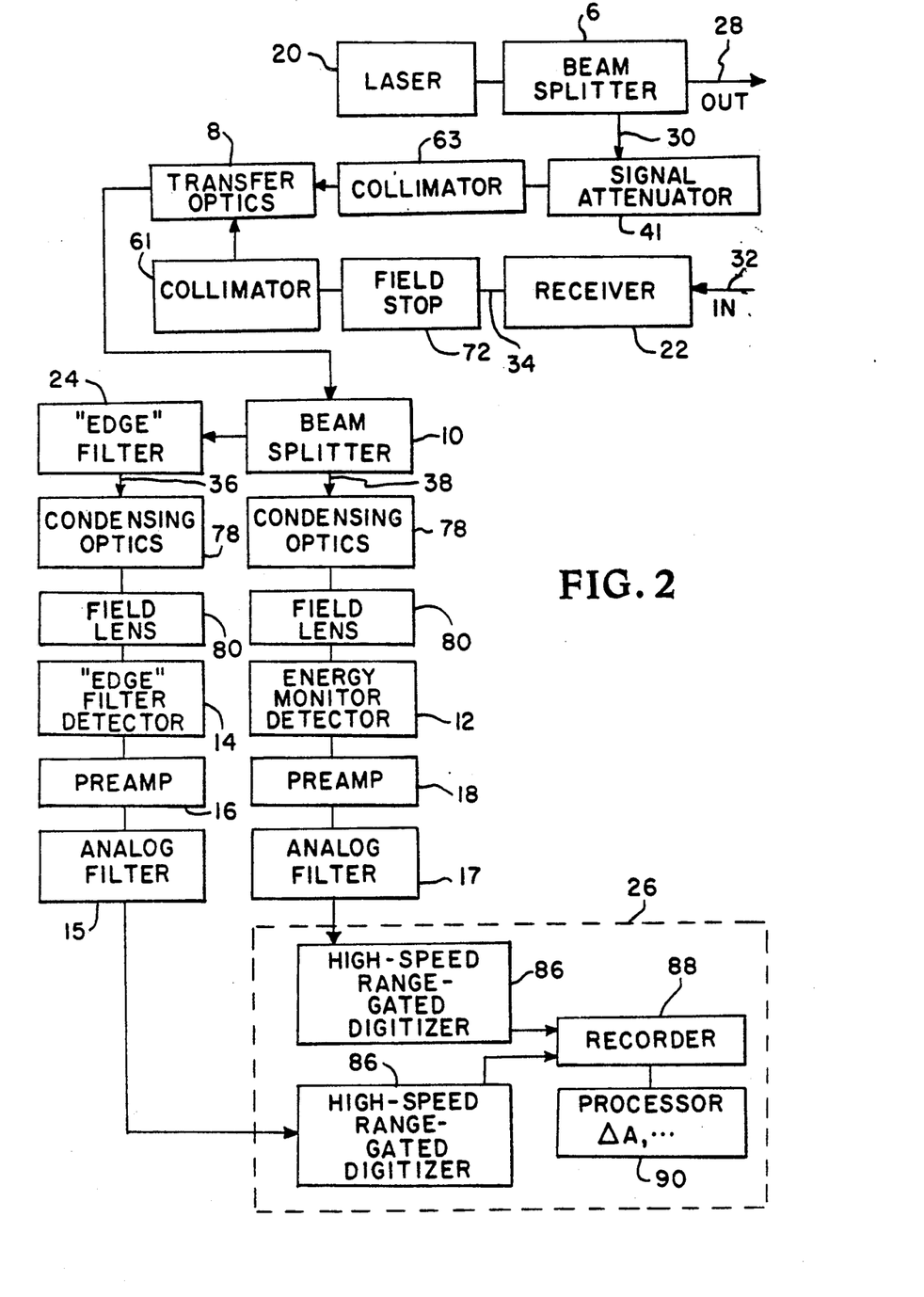
FIG. 2 is a block diagram of the laser apparatus of FIG. 1.

Referring now to FIG. 2, a block diagram of the lidar apparatus for velocity measurement of FIG. 1 is shown. As in FIG. 1, receiver 22 receives the incoming pulses 32. The output of receiver (telescope) 22 is supplied to a field stop 72 which is set at a size that will correspond to a field of view that is no less than the field of view of the transmitting laser 20 for maximum efficiency. The output of field stop 72 is supplied to collimator 61 which collimates the beam to satisfy any angular field requirements of the edge filter 24. Picked off signal 30 is supplied to signal attenuator 41 to attenuate this signal so that at beamsplitter 10 this signal will have the same level as that backscattered from the atmosphere. The output of signal attenuator 41 is supplied to collimator 63 to match the angular field of the output signal of the collimator 63 to that of the angular field of the output signal of collimator 61. Transfer optics 8 (i.e., the beam splitting mirror) follows collimator 61 and collimator 63 for directing incoming signal 34 and "picked-off" signal 30 to beam splitting mirror 10 where the signal is split again and directed to "edge" filter 24 and to the energy monitor channel. Condensing optics 78 bring the received beam to a focal point. Field lens 80, located at the focal point of the condensing optics, eliminates the effect of spatial considerations in the field of view and focuses the beam on "edge" filter detector 14 and energy monitor detector 12, which may be a photomultiplier tube, an avalanche photodiode, or other light-to-electronic (photoelectric) signal converters. The outputs of detectors 12 and 14 are applied to preamplifiers 18 and 16 respectively, to analog filters 17 and 15 (which filter out frequencies that are $>\frac{1}{2}\Delta t$ where $\Delta t$ is the time corresponding to a roundtrip range gate width of 2 $\Delta R$), and thereafter to high speed range gated digitizers 86 that convert the analog output signal from detectors 12 and 14 into a number of selected adjacent narrow bin range gates and thereafter to a digital signal. The outputs of digitizers 86 are applied to an optional recorder 88 and are then processed in processor 90 to determine the frequency, e.g., Doppler, shift as a function of range and calculate the velocities of the targets as a function of range according to the discussions and algorithms given below.

In the apparatus of FIGS. 1 and 2, the Doppler shift, and therefore target velocity, is determined by a differential measurement of the frequency of the outgoing laser signal 28 and the laser return signal 32 backscattered from the atmosphere or the hard target. This is accomplished by normalizing the outputs of "edge" filter detector 14 with the output of the energy monitor 12, for both the outgoing and return laser signals on a per pulse basis. The Doppler shift is then determined utilizing a knowledge of the average slope of the "edge" of "edge" filter 24 response for the region of the measurement. The use of a normalized output makes the "edge" measurement independent of the magnitude of the incident signal level. Due to the differential nature of the frequency measurement, the result is also insensitive to laser frequency jitter and drift. The measurement can be set up for maximum sensitivity by utilizing that region on the "edge" of the filter 24 transmission profile which has the greatest fractional change in measured signal for a given frequency shift. For a given incident photon flux, the point of minimum measurement error can be obtained by optimizing the measurement sensitivity and the signal to noise observed at the point of measurement.

The basic steps in determining target velocity utilizing the "edge" technique are as follows: the signal 36 emerging from "edge" filter 24, and measured by "edge" filter detector 14, is determined by equation (2). The signal 38 measured by energy monitor detector 12 is determined by equation (3). The ratio of these two signals gives the normalized "edge" signal. This is determined for the outgoing laser signal 28 (i.e., for picked-off signal 30) by equation (4). The corresponding normalized signal for an atmospheric backscattered or hard target return signal 32, which is Doppler shifted, is determined by equation (5). The outgoing normalized laser signal is then subtracted from the backscattered normalized signal to obtain the differential normalized signal, as shown by equation (6). It should be noted that for an atmospheric measurement using a pulsed laser or a modulated CW laser, the differential normalized signal is determined as a function of range since the backscattered normalized signal has been sampled by range gating the outputs of detectors 14 and 12. For a hard target, the backscattered signal may occur for only one or a few range elements. The Doppler shift is found from the differential normalized signal and a knowledge of the slope of the "edge" function in the region of the measurement as given in equations (7) and (8). Alternatively, the Doppler shift may be found directly from the outgoing and backscattered normalized signals, equations (4) and (5), using a lookup table. The "edge" technique is relatively insensitive to the laser spectral width and shape and does not require a pure monochromatic laser. This is shown in equations (10), (11), and (12). Equation (13) gives the relationship between the Doppler shift and the component of the velocity along the line of sight of the laser. The velocity is given in terms of the measured parameters, the differential normalized signal and the slope of the "edge" function, in equation (14).

Figure 3:
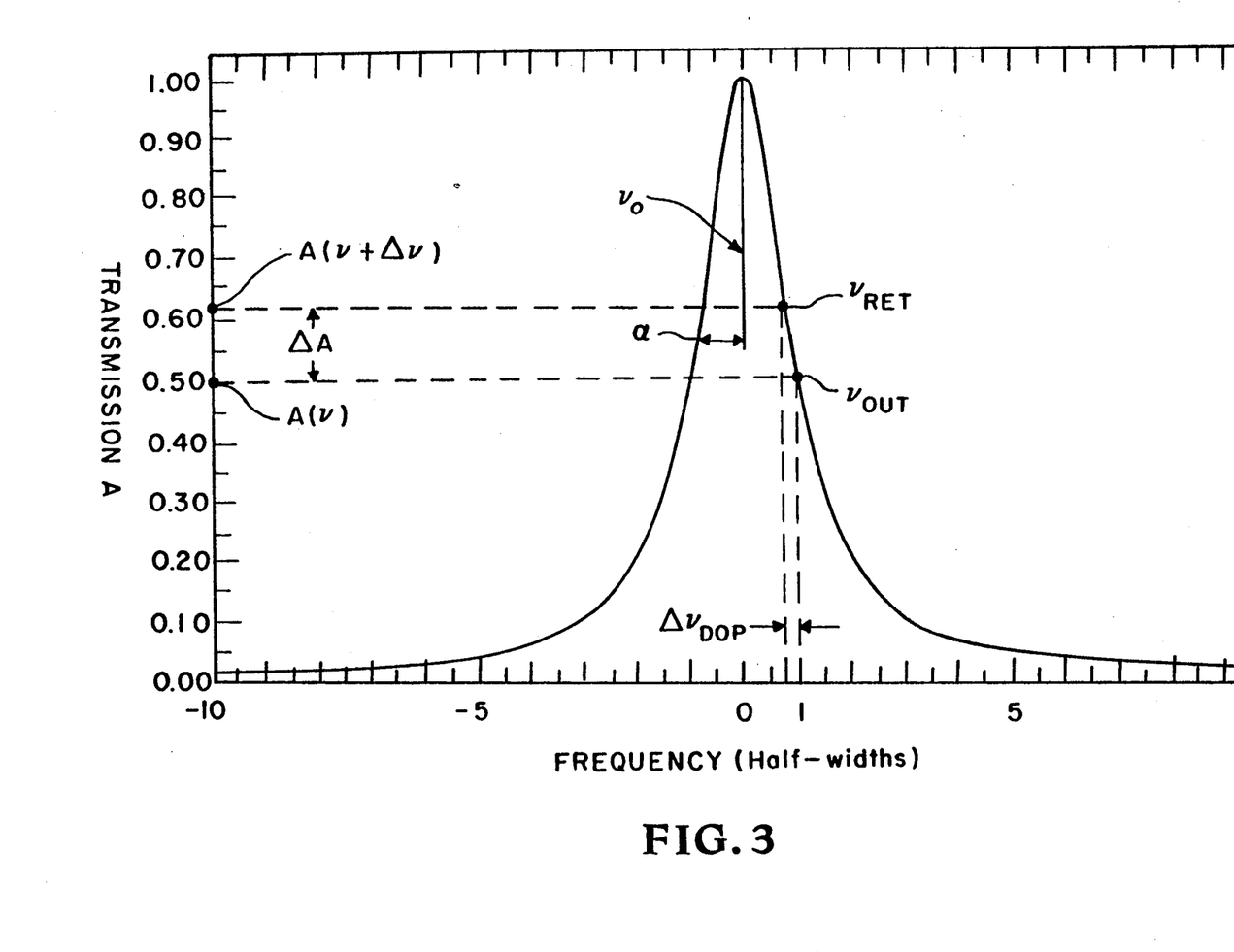
FIG. 3 is a graph of the response function of the "edge" filter used in the apparatus of FIG. 1.

An "edge" filter 24 with a spectrally sharp response function is required and is characterized by the central frequency $\gamma_o$, and the half-width $\alpha$ (HWHM), as shown in FIG. 3. For a laser 20 centered at frequency $\gamma$, the transmission $A(\gamma)$ of "edge" filter 24 (as observed by laser 20) is:

$$A(\nu) = \int_{-\infty}^{\infty} h(\nu - \nu')a(\nu')d\nu' \qquad (1)$$

where $h(\gamma-\gamma')$ is the spectral distribution of the laser energy and it is normalized, the integral of $h(\gamma-\gamma')$, to have unit area, and $a(\gamma')$ is the transmission function of "edge" filter 24. It should be noted that for an "edge" measurement with a laser whose width is small compared to the half-width of the "edge" filter, $\gamma$, the measured transmission, $A(\gamma)$, is essentially equivalent to the monochromatic "edge" transmission function, a $(\gamma)$.

The signal transmitted through "edge" filter 24 and measured by "edge" filter detector 14, $I(\gamma)$, is given by:

$$I(\gamma) = GgI_oA(\gamma) \qquad (2)$$

where $I_o$ is the incident laser signal, G is the "edge" detector 14 gain and g is the "edge" filter detector 14 quantum efficiency times the transmission of all optical elements in the "edge" channel other than "edge" filter 24.

To account for the magnitude of the backscattered signal, an additional detector 12 is used as an energy monitor detector to measure the intensity of the beam prior to transmission through the "edge" filter 24. Its signal, $I_{EM}$, is given as:

$$I_{EM} = G_o g_o I_o \qquad (3)$$

where $G_o$ is the energy monitor detector 12 gain, and $g_o$ is the product of the energy monitor detector 12 quantum efficiency and the optical transmission of the energy monitor channel. The ratio of the signals from the "edge" filter detector 14 and the energy monitor detector 12 gives the normalized signal $I_N(\gamma)$ as:

$$I_N(\gamma) = C \cdot A(\gamma) \quad (4)$$

where:

$$C = \frac{G_g}{G_0 g_0}$$

The constant C is the ratio of the responsivities of detectors 14 and 12 times the optical efficiencies of the "edge" and energy monitor channels, except for the transmission of "edge" filter 24. The value of C is determined by a calibration measurement. It should be noted that if the ratio of the responsivities of detectors 14 and 12 is non-linear, a polynomial could be used for the calibration term.

The Doppler shift is determined from a differential frequency measurement as follows: a small portion of the outgoing laser beam is sampled (signal 30) to measure the normalized signal $I_N(\gamma)$, as given in Equation (4). The laser energy backscattered from the atmosphere is Doppler shifted by an amount $\Delta\gamma$. The backscattered signals $I(\gamma+\Delta\gamma)$ and $I_{Em}$ are measured by the "edge" and energy monitor detectors 14 and 12, respectively, as before. The normalized signal is found as:

$$I_N(\gamma+\Delta\gamma) = C \cdot A(\gamma+\Delta\gamma) \quad (5)$$

The difference in the normalized signals $\Delta I_N$, is found by subtracting Equation (4) from Equation (5) to obtain:

$$\Delta I_N = C \cdot [A(\gamma+\Delta\gamma) - A(\gamma)] \quad (6)$$

The quantity in brackets in Equation (6) is the change in the transmission of the "edge" filter 24 between the outgoing and backscattered measurements, due to the Doppler shift, as observed with the laser. The Doppler shift is found from Equation (6) as:

$$\Delta\nu = \frac{\Delta I_N}{C \cdot \beta(\nu,\Delta\nu)} \quad (7)$$

where $$\beta(\nu,\Delta\nu) = \frac{A(\nu+\Delta\nu) - F(\nu)}{\Delta\nu} \quad (8)$$

The physical interpretation of equation (8) is that $\beta$ is the average slope of the "edge" function as observed with the laser on the finite interval $\gamma$ to $\gamma+\Delta\gamma$. An expression for $\beta$ can be found using a Taylor series expansion of $A(\gamma+\Delta\gamma)$ as:

$$\beta(\nu,\Delta\nu) = A'(\nu) + A''(\nu) \cdot \frac{\Delta\nu}{2} + \ldots \quad (9)$$

where $A'$ and $A''$ are the first and second derivatives of $A(\gamma)$. The instrument spectral response, $A(\gamma)$ and its derivative $F'(\gamma)$ can be determined by scanning either the laser or the "edge" filter in frequency over the range of frequencies to be utilized in the "edge" measurement. The value of $A'(\gamma)$ can be used as an initial value for $\beta$ in Equation (7). For small Doppler shifts, this is essentially an exact solution. For large Doppler shifts, the shift determined from Equation (7) can be used iteratively with Equation (8) to determine $\beta$, and thus $\Delta\gamma$, to any required accuracy.

Alternatively, the Doppler shift may be found directly from Equations (4) and (5). A lookup table of $\gamma$ versus $A(\gamma)$, generated by scanning either the laser or the "edge" filter over the other element during system calibration, is used to find $\gamma$ for each of the two measured values of transmission, $A(\gamma)$ and $A(\gamma+\Delta\gamma)$. The Doppler shift is the difference of the two frequencies. In addition, if the calibration factor "C" is known, and the transmission "A" of the edge filter at the outgoing frequency is known, then $I_N(\gamma)$ can be calculated directly from Equation (4).

Two important features of the "edge" technique are the insensitivity of the measurement to the laser spectral width and shape. It is clear from Equation (7) that the measurement of the Doppler shift will be independent of the laser spectral width and shape if the differential normalized signal, $\Delta I_N$, and the average slope, $\beta$, are independent of these properties. From Equation (6) and the definition of F, Equation 1, it follows that $\Delta I_N$ can be expressed as:

$$\Delta I_N = C \cdot \int_{-\infty}^{\infty} h(\nu - \nu'') \cdot [a(\nu'' + \Delta\nu) - a(\nu'')] d\nu'' \quad (10)$$

where a change of variable, $\gamma'' = \gamma' - \Delta\gamma$, has been made. For the case of an "edge" measurement where the "edge" function, $f(\gamma)$, is linear over the laser width and the region of the measurement, $\gamma'' - \Delta\gamma_L$ to $\gamma'' + \Delta\gamma + \Delta\gamma_L$ (where $\gamma_L$ is the laser HWHM), the quantity in brackets in Equation (10) is a constant. Thus, the differential normalized signal $$\Delta I_N = C \cdot [a(\gamma'' + \Delta\gamma) = a(\gamma'')] \quad (11)$$

is independent of the laser spectral width and shape. Similarly, the average slope $\beta$ is given as $$\beta(\nu,\Delta\nu) = \int_{-\infty}^{\infty} h(\nu - \nu'') \cdot \left[\frac{a(\nu'' + \Delta\nu) - a(\nu'')}{\Delta\nu}\right] d\nu'' \quad (12)$$

The term in brackets in equation (12) is the slope of $a(\gamma)$ which is a constant if $a(\gamma)$ satisfies the conditions described above. An expression for $\beta$ analogous to Equation (11) results. Thus, $\beta$ as well as $\Delta I_N$, are independent of the laser spectral width and shape. It follows that if $a(\gamma)$ is linear over the laser width and region of measurement, the determination of the Doppler shift, $\Delta\gamma$, is independent of the laser spectral properties and is equivalent to a measurement with a monochromatic laser. It also follows that over the region where the "edge" may be characterized as linear, the measurement is independent of the exact location on the "edge".

Due to the two-way path in a lidar measurement, the backscattered radiation is Doppler shifted twice, that is:

$$\Delta\nu = \left[\frac{2\nu}{c}\right] \cdot v \quad (13)$$

where v is the component of the velocity of the scatterers along the line of sight of the laser and c the speed of light. The velocity is found from Equations (7) and (13) as:

$$v = \frac{c}{2\nu} \cdot \frac{\Delta I_N}{C \cdot \beta} \quad (14)$$

The change in normalized signal, $\Delta I_N$ for a velocity v is found from Equation (14) as:

$$\Delta I_N = \frac{2v}{C} \cdot Cv\beta \quad (15)$$

It is useful to define the measurement sensitivity as the fractional change in the normalized measured signal for a velocity of 1 m/sec. The sensitivity is:

$$\Theta = \frac{1}{v} \cdot \frac{\Delta I_N}{I_N} \quad (16)$$

The velocity error $\epsilon$, in m/sec, at a given point on the "edge" can be computed from the sensitivity by noting that:

$$\epsilon = \frac{1}{(S/N) \cdot \Theta} \quad (17)$$

where (S/N) is the signal-to-noise ratio for the measurement of the differential normalized signal. The error associated with the signal-to-noise is dominated by the error in the atmospheric component of the differential normalized signal measurement. For the case of moderately high signal-to-noise in both the "edge" and energy monitor channels the noise in the measurement may be considered to be uncorrelated and the composite signal-to-noise is given as:

$$\frac{1}{(S/N)} = \sqrt{\frac{1}{(S/N)_1^2} + \frac{1}{(S/N)_2^2}} \quad (18)$$

where $(S/N)_1$ and $(S/N)_2$ are the signal-to-noise terms for the measurement of the atmospheric backscattered signal by the "edge" filter and energy monitor detectors 14 and 12, respectively.

Figure 4:
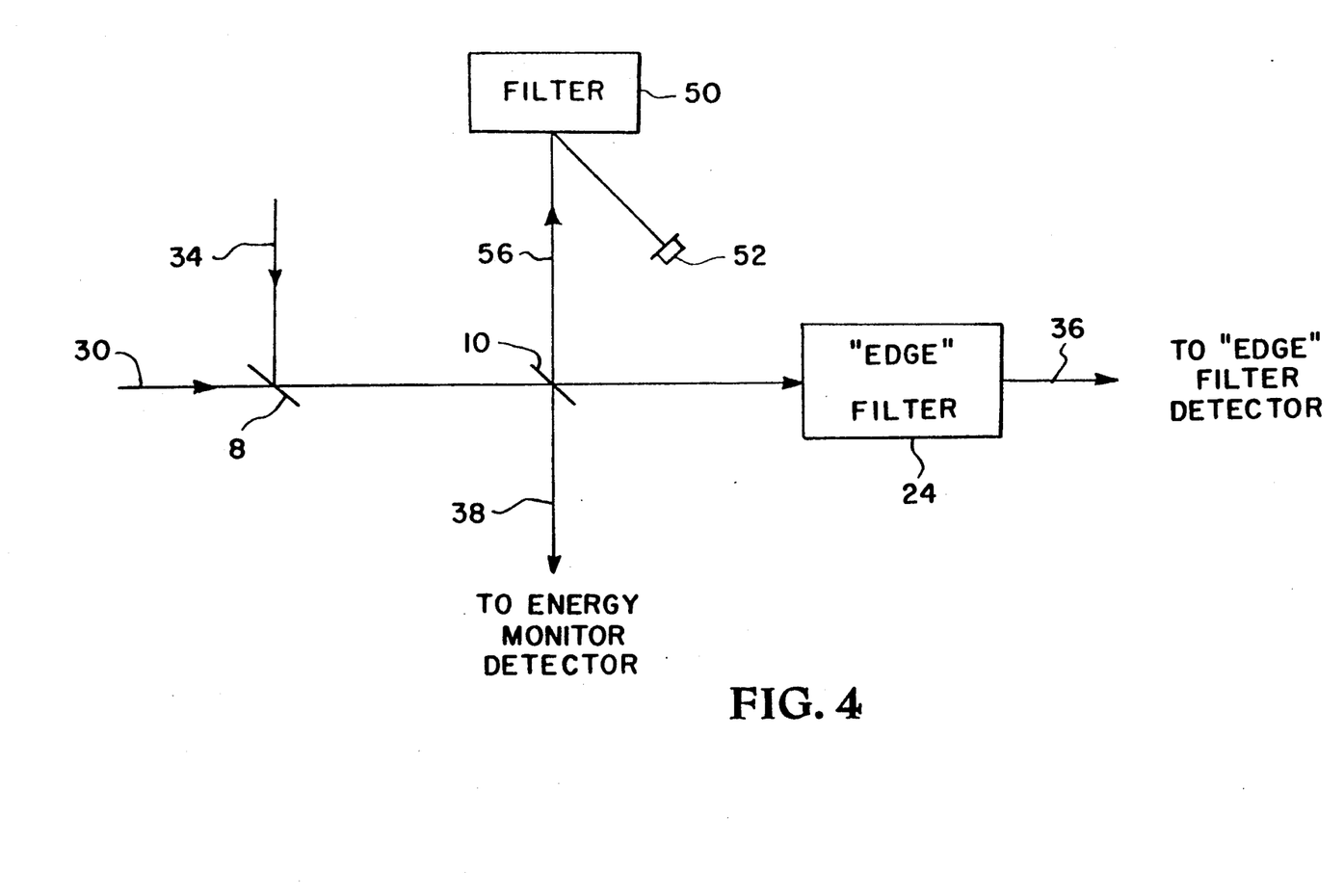
FIG. 4 is a schematic diagram depicting the use of a second filter to compensate for the Rayleigh return signal.

To illustrate the power of the "edge technique" of the present inventive concept in a lidar wind measurement application, two examples which employ the central fringe of a Fabry-Perot etalon as the "edge" filter 24 will now be discussed. There are two fundamentally different ways that the etalon can be used to measure the wind. The Fabry-Perot can be used in the form of a high resolution "edge" filter to measure the shift of the aerosol return or hard target which has the original sharp spectral distribution of the laser. This technique can be used in the visible/near infrared region to achieve high sensitivity. A Nd:YAG laser 20 could be utilized at either the fundamental at 1.06 μm or the second harmonic at 0.53 μm. For a plane-parallel etalon with an air gap of 5 cm and a finesse of 30, the etalon fringe halfwidth, α, is 0.00165 cm$^{-1}$. A fractional change in the differential normalized signal of 3.8% would occur at the halfwidth for a velocity of 1 m/sec at 1.06 μm with this configuration. The same fractional change in signal could also be obtained at 0.53 μm by decreasing the air gap or finesse by a factor of two. The broadband Rayleigh return for this case will constitute a DC background which must be compensated for. This can be accomplished as shown in FIG. 4 by using the signal 56 reflected from the high resolution etalon "edge" filter 24 which contains a large fraction of the Rayleigh signal as well as an aerosol component. A second etalon centered filter 50 is introduced in this beam to eliminate the aerosol component reflected from filter 50. Signal 56 travels to filter 50 via beam splitter 10 and then to range gated detector 52. The signal at detector 52 consists mainly of the Rayleigh component and almost none of the aerosol component. With a knowledge of the spectral response of the two etalons, an estimate of the Rayleigh width and a knowledge of the gain of the Rayleigh correction detector 52 (G*) and the product of its quantum efficiency and the optical transmission of the Rayleigh correction channel (g*), the magnitude of the Rayleigh component is determined by an analysis is utilized that is very similar to that presented earlier (equations 2 and 3). The aerosol signal for the edge detector 14 and energy monitor detector 12 may then be determined by subtracting the corresponding Rayleigh component from each of the above detector signals.

Figure 5:
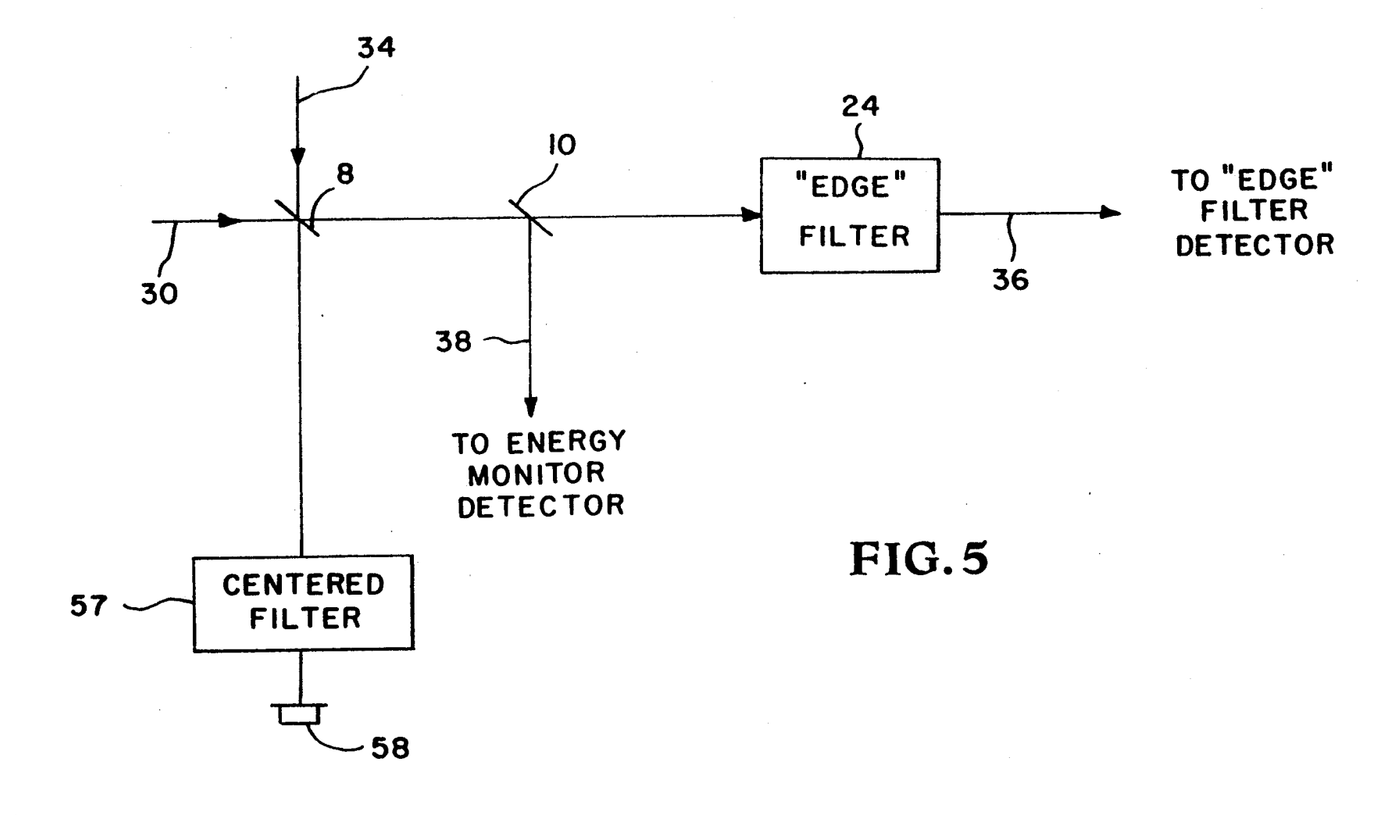
FIG. 5 is also a schematic diagram depicting the use of a second filter to compensate for the Rayleigh return signal.

Other approaches to determine the Rayleigh signal are possible as shown in FIG. 5. For example, a third Rayleigh correction channel could be split off of the incoming signal using for example the component of the incoming signal 34 which is transmitted by beamsplitter 8 (or by splitting the signal in the energy monitor channel-signal 38). Centered filter 57 which is centered on the laser frequency would then transmit essentially all of the aerosol component of the incoming signal but only a fraction of the incoming Rayleigh to detector 58 whose output is range gated. With a knowledge of the centered filter 57 spectral response, an estimate of the Rayleigh width, and a knowledge of the gain and quantum efficiency of detector 58 and the optical transmission of the Rayleigh correction channel, the Rayleigh component is determined. The aerosol signal for the edge and energy monitor detectors 14 and 12 may then be found by subtracting the Rayleigh component from each of the above detector signals. It is noted that the detector and optical efficiency constants for the different channels appear in the form of ratios in a manner similar to the constant C in Eq. (4). These constants can be determined by a calibration measurement.

The second approach is to use a lower resolution Fabry-Perot, whose width is larger than or of the order of the Rayleigh width, to measure the shift of the combined Rayleigh and aerosol returns. This method has reduced sensitivity but also has dramatically increased signal for measurements in the ultraviolet. Lasers which can be used for this measurement include Nd:YAG tripled to a wavelength of 355 nm, or various excimer lasers. A plane FabryPerot etalon with an air gap of 5 mm and a finesse of 16 would have a fringe half-width of 0.062 cm$^{-1}$. This is approximately equal to the half-width of the thermally broadened Rayleigh spectrum at 355 nm and a temperature of 280 K. Such a system has a fractional change in the differential normalized signal at the halfwidth of 0.3% for a velocity of 1 m/sec. The normalized signal determination for the outgoing laser beam utilizes a relatively narrowband laser whereas the corresponding measurement for the atmospheric return uses the broadband Rayleigh backscattered signal. The effect of laser bandwidth is minimized by the "edge" technique. Even when the effect of bandwidth is not negligible as in the above case, it can be compensated for by correcting the backscattered normalized signal for the effects of Rayleigh width. An estimate of the Rayleigh width is the only additional information required to make this correction. The corrected normalized signal $I_{NC}$ is:

$$I_{NC} = I_{Nm} \cdot \frac{A(\nu)}{F^*(\nu)} \qquad (19)$$

where $I_{Nm}$ is the measured normalized signal, $A(\gamma)$ is the convolution of the laser and the monochromatic "edge" function (see Eq. 1), and $A(\gamma)$ is the convolution of the "edge" filter, laser and Rayleigh spectral distributions.

Various other instruments could be used to produce an "edge" filter with a sharp spectral feature. Some examples include the use of a spherical Fabry-Perot etalon, a Fizeau etalon, a grating, prism, atomic blocking filter, or a narrow absorption line. Also, two filters of the same type can be used together, i.e., two Fabryperot etalons in series, or combinations of two or more different filters could be used. A variety of lasers can be utilized since there are no inherent restrictions on the choice of wavelength using the "edge technique". Examples of lasers that could be used include Nd:YAG, Alexandrite, Ti:Sapphire, AlGaAs diodes, $CO_2$, Er:YLF, Er:YAG, KrF, XeCl, and other excimer lasers. The primary requirement is that the spectral bandwidth of the laser should be less than $\approx 1000$ times the smallest Doppler shift that is to be measured. Selection of the wavelength is based on the atmospheric or hard target backscatter, atmospheric transmittance and the performance characteristics of the laser and detector. The general principles of the "edge" measurement are common to all of the approaches.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A method for determining the frequency shift in a laser system comprising the steps of:
    transmitting an outgoing laser beam, whose transmission characteristic on a filter means having a spectrally sharp response function is known;
    receiving an incoming laser beam having a frequency shift;
    supplying a portion of said incoming laser beam to a first detector means, and supplying a portion of said incoming laser beam through said filter means to a second detector means;
    deriving a first normalized signal which is proportional to the transmission of said filter means at the frequency of said incoming laser beam;
    deriving a second normalized signal which is proportional to the transmission of said filter means at the frequency of said outgoing laser beam; and
    determining said frequency shift by processing said first and said second normalized signals.

2. The method of claim 1 wherein said step of deriving a second normalized signal comprises the steps of:
    supplying a portion of said outgoing laser beam to said first detector means, and supplying a portion of said outgoing laser beam through said filter means to said second detector means; then
    deriving said second normalized signal which is proportional to the transmission of said filter means at the frequency of said outgoing laser beam.

3. The method of claim 1 wherein said step of determining said frequency shift by processing said first and said second normalized signals comprises the steps of:
    deriving a differential normalized signal by subtracting said second normalized signal from said first normalized signal;
    deriving the slope of the response function of said filter means over the interval between the frequency of said outgoing laser beam and the frequency of said incoming laser beam; and
    determining said frequency shift using said differential normalized signal and said response function slope of said filter means.

4. The method of claim 1 wherein said step of determining said frequency shift by processing said first and said second normalized signals comprises the step of:
    deriving said frequency shift from data correlating said first normalized signal to the transmission of said filter means at the frequency of said incoming laser beam and said second normalized signal to the transmission of said filter means at the frequency of said outgoing laser beam.

5. The method of claim 3 wherein said step of determining said frequency shift using said differential normalized signal and said response function slope of said filter means includes determining said frequency shift from a ratio of said differential normalized signal to the product of said response function slope of said filter means and a system calibration constant.

6. The method of claim 5 wherein said system calibration constant comprises the product of the ratio of the responsivities of said second and first detector means and the optical efficiency of the channels containing said detector means, excluding the transmission of said filter means.

7. The method of claim 1 wherein said step of determining said frequency shift includes utilizing a region on the edge of the filter transmission response function having a large change in transmission for a given frequency shift.

8. The method of claim 1 wherein said step of determining said frequency shift includes utilizing a region on the edge of the filter transmission response function having a large fractional change in transmission for a given frequency shift.

9. The method of claim 3 wherein said response function slope of said filter means is derived using a Taylor series expansion.

10. The method of claim 3 wherein said response function slope of said filter means is derived from a calibration procedure in which the change in transmission of said filter means due to a given change in frequency of said laser is experimentally observed over the interval defining the "edge" of said filter means.

11. The method of claim 1 wherein the spectral bandwidth of said laser system is much larger than the smallest frequency shift to be determined.

12. The method of claim 1 further comprising the steps of:
    supplying a portion of said incoming laser beam to an additional filter means having an associated third detector means communicating with said filter means for acquisition of a signal which allows the Rayleigh component in said incoming laser beam to be determined,
    processing said signal and said portions of said incoming laser beam to determine an aerosol component in said portions, and
    processing said aerosol component of said portions of said incoming laser beam to determine said first normalized signal in a combined aerosol and broadband Rayleigh incoming laser beam.

13. The method of claim 1 wherein a pulsed laser is used to transmit said outgoing laser beam and a range gated receiver is used to receive said incoming laser beam thereby allowing said frequency shift to be determined as a function of range.

14. The method of claim 1 wherein a continuous wave laser is modulated and used to transmit said outgoing laser beam and a range gated receiver is used to receive said incoming laser beam thereby allowing said frequency shift to be determined as a function of range.

15. The method of claim 1 wherein a continuous wave laser is used to transmit said outgoing laser beam.

16. A method for determining the frequency shift in a laser system comprising the steps of:
- transmitting an outgoing laser beam whose frequency is known with respect to a selected frequency characteristic of a filter means having a spectrally sharp response;
- receiving an incoming laser beam having a frequency shift;
- supplying a portion of said incoming laser beam to a first detector means, and supplying a portion of said incoming laser beam through said filter means to a second detector means;
- deriving a first normalized signal which is proportional to the transmission of said filter means at the frequency of said incoming laser beam; and
- determining said frequency shift by comparing a frequency derived from said first normalized signal and said outgoing laser beam frequency.

17. A laser system comprising:
- means for transmitting an outgoing laser beam, whose transmission characteristic on a filter means having a spectrally sharp response function is known;
- means for receiving an incoming laser beam having a frequency shift;
- means for supplying a portion of said incoming laser beam to a first detector means, and means for supplying a portion of said incoming laser beam through said filter means to a second detector means;
- means for deriving a first normalized signal which is proportional to the transmission of said filter means at the frequency of said incoming laser beam;
- means for deriving a second normalized signal which is proportional to the transmission of said filter means at the frequency of said outgoing laser beam; and
- means for determining said frequency shift by processing said first and said second normalized signals.

18. The system of claim 17 wherein said means for deriving a second normalized signal comprises:
- means for supplying a portion of said outgoing laser beam to said first detector means, and means for supplying a portion of said outgoing laser beam through said filter means to said second detector means;
- means for deriving said second normalized signal which is proportional to the transmission of said filter means at the frequency of said outgoing laser beam.

19. The system of claim 17 wherein said means for determining said frequency shift by processing said first and said second normalized signals comprises:
- means for deriving a differential normalized signal by subtracting said second normalized signal from said first normalized signal;
- means for deriving the slope of the response function of said filter means over the interval between the frequency of said outgoing laser beam and the frequency of said incoming laser beam;
- means for determining said frequency shift using said differential normalized signal and said response function slope of said filter means.

20. The system of claim 17 wherein said means for determining said frequency shift by processing said first and said second normalized signals comprises:
- means for deriving said frequency shift from data correlating said first normalized signal to the transmission of said filter means at the frequency of said incoming laser beam and said second normalized signal to the transmission of said filter means at the frequency of said outgoing laser beam.

21. The system of claim 19 wherein said means for determining said frequency shift using said differential normalized signal and said response function slope of said filter means includes means for determining said frequency shift from a ratio of said differential normalized signal to the product of said response function slope of said filter means and a system calibration constant.

22. The system of claim 21 wherein said system calibration constant comprises the product of the ratio of the responsivities of said second and first detector means and the optical efficiency of the channels containing said detector means, excluding the transmission of said filter means.

23. The system of claim 17 wherein said means for determining said frequency shift includes utilizing a region on the edge of the filter transmission response function having a large change in transmission for a given frequency shift.

24. The system of claim 17 wherein said means for determining said frequency shift includes utilizing a region on the edge of the filter transmission response function having a large fractional change in transmission for a given frequency shift.

25. The system of claim 19 wherein said response function slope of said filter means is derived using a Taylor series expansion.

26. The system of claim 19 wherein said response function slope of said filter means is derived from a calibration procedure in which the change in transmission of said filter means due to a given change in frequency of said laser is experimentally observed over the interval defining the "edge" of said filter means.

27. The system of claim 17 wherein the spectral bandwidth of said laser system is much larger than the smallest frequency shift to be determined.

28. The system of claim 17 further comprising:
- means for supplying a portion of said incoming laser beam to an additional filter means having an associated third detector means communicating with said filter means for acquisition of a signal which allows the Rayleigh component in said incoming laser beam to be determined,
- means for processing said signal and said portions of said incoming laser beam to determine an aerosol component in said portions,
- means for processing said aerosol component of said portions of said incoming laser beam to determine said first normalized signal in a combined aerosol and broadband Rayleigh incoming laser beam.

29. The system of claim 17 wherein a pulsed laser is used to transmit said outgoing laser beam and a range gated receiver is used to receive said incoming laser beam thereby allowing said frequency shift to be determined as a function of range.

30. The system of claim 17 wherein a continuous wave laser is modulated and used to transmit said outgoing laser beam and a range gated receiver is used to receive said incoming laser beam thereby allowing said frequency shift to be determined as a function of range.

31. The system of claim 17 wherein a continuous wave laser is used to transmit said outgoing laser beam.

32. A laser system comprising:

means for transmitting an outgoing laser beam whose frequency is known with respect to a selected frequency characteristic of a filter means having a spectrally sharp response;

means for receiving an incoming laser beam having a frequency shift;

means for supply a portion of said incoming laser beam to a first detector means, and supplying a portion of said incoming laser beam through said filter means to a second detector means;

means for deriving a first normalized signal which is proportional to the transmission of said filter means at the frequency of said incoming laser beam; and means for determining said frequency shift by comparing a frequency derived from said first normalized signal and said outgoing laser beam frequency.

* * * * *